(12) United States Patent  
Wakefield

(10) Patent No.: US 8,351,980 B2  
(45) Date of Patent: Jan. 8, 2013

(54) MOBILE DEVICE FOR DETECTING AND INDICATING LOSS OF PROXIMITY FOR ASSOCIATED SUPPORT FUNCTIONS

(75) Inventor: Ivan Nelson Wakefield, Cary, NC (US)

(73) Assignee: Sony Ericsson Mobile Communications AB, Lund (SE)

(*) Notice: Subject to any disclaimer, the term of this patent is extended or adjusted under 35 U.S.C. 154(b) by 30 days.

(21) Appl. No.: 12/749,554

(22) Filed: Mar. 30, 2010

(65) Prior Publication Data

US 2010/0184378 A1     Jul. 22, 2010

Related U.S. Application Data

(62) Division of application No. 11/389,320, filed on Mar. 24, 2006, now Pat. No. 7,715,831.

(51) Int. Cl.
*H04B 5/02* (2006.01)
*H04B 7/26* (2006.01)

(52) U.S. Cl. .................. 455/550.1; 455/571; 340/426.1

(58) Field of Classification Search ................ 455/571, 455/550.1; 340/426.1; 345/156
See application file for complete search history.

(56) References Cited

U.S. PATENT DOCUMENTS

| | | | |
|---|---|---|---|
| 5,422,934 A * | 6/1995 | Massa | 455/571 |
| 7,280,097 B2 * | 10/2007 | Chen et al. | 345/156 |
| 7,298,246 B1 * | 11/2007 | Schmitt | 340/426.1 |
| 2005/0287981 A1 | 12/2005 | Hill | |

FOREIGN PATENT DOCUMENTS

| | | |
|---|---|---|
| CN | 1358042 | 7/2002 |
| CN | 1625068 A | 6/2005 |
| DE | 20112099 U1 | 11/2001 |
| FR | 2869187 | 10/2005 |
| GB | 2397467 A | 7/2007 |
| JP | 2006-020226 | 1/2006 |
| WO | WO 98/34417 | 8/1998 |

OTHER PUBLICATIONS

First Office Action dated Dec. 10, 2010 corresponding to Japanese Patent Application No. 2009-501408, 4 pages.
Communication pursuant to Article 94(3) EPC dated Dec. 12, 2010 corresponding to European Application No. 06 827 307.7.
Notification of Transmittal of the International Search Report and the Written Opinion of the International Searching Authority, or the Declaration corresponding to PCT/US2006/042694 mailed on Apr. 2, 2007.
Second Office Action dated Oct. 8, 2010 corresponding to Chinese Patent Application No. 200680053966.5; 15 pages.
$3^{rd}$ Office Action dated Jul. 13, 2011 corresponding to Chinese Patent Application No. 200680053966.5, (15 pages includes Office Action in Chinese).

* cited by examiner

Primary Examiner — William D Cumming
(74) Attorney, Agent, or Firm — Myers Bigel Sibley & Sajovec, P.A

(57) ABSTRACT

Methods of detecting proximity between a mobile terminal and a wireless accessory device having an associated support function for use with the mobile terminal include establishing a wireless communication connection between the wireless accessory device and the mobile terminal. The established wireless communication connection is utilized to provide the associated support function. In addition, a wireless signal having a limited range is communicated between the mobile terminal and the wireless accessory device. The wireless signal indicates a proximity between the mobile terminal and the wireless accessory device. An alert signal indicating that the proximity between the mobile terminal and the wireless accessory device has exceeded a predetermined range is provided responsive to the communicated wireless signal when the established wireless communication connection is not being utilized to provide the associated support function. Related devices are also provided.

11 Claims, 6 Drawing Sheets

MOBILE DEVICE FOR DETECTING AND INDICATING LOSS OF PROXIMITY FOR ASSOCIATED SUPPORT FUNCTIONS

CROSS REFERENCE TO RELATED APPLICATION

The present application is a divisional of and claims priority from U.S. patent application Ser. No. 11/389,320 filed on Mar. 24, 2006 now U.S. Pat. No. 7,715,831, the disclosure of which is hereby incorporated by reference herein in its entirety.

FIELD OF THE INVENTION

The present invention relates to mobile devices, and more particularly, to mobile devices including proximity detection and methods of operating the same.

BACKGROUND OF THE INVENTION

Mobile terminals are widely used for voice, data, and/or multimedia communications. Due to the widespread use of mobile terminals, many users have experienced the inconvenience of misplacing or losing a mobile terminal, and/or having a mobile terminal stolen. For example, a mobile terminal user may inadvertently leave his or her mobile terminal behind at a restaurant, shopping center, and/or other public location. In addition, a thief, such as a pickpocket, may be able to steal a user's mobile terminal from the user's purse and/or pocket without the user's knowledge. In either scenario, unauthorized use of the mobile terminal may occur, which may result in additional charges to the user's account in addition to the cost of replacing the lost or stolen mobile terminal.

SUMMARY OF THE INVENTION

Some embodiments of the present invention provide methods for detecting proximity at a portable device. More particularly, a wireless communication connection is established between a mobile terminal and a wireless accessory device having an associated support function for use with the mobile terminal, and the established wireless communication connection is utilized to provide the associated support function. In addition, a wireless signal having a limited range is communicated between the mobile terminal and the wireless accessory device to indicate a proximity between the mobile terminal and the wireless accessory device. An alert signal indicating that the proximity between the mobile terminal and the wireless accessory device has exceeded a predetermined range is provided responsive to the communicated wireless signal when the established wireless communication connection is not being utilized to provide the associated support function.

In some embodiments, the wireless signal may be a designated signal communicated over the established wireless communication connection. In other embodiments, the wireless signal may be communicated over a second wireless communication connection between the mobile terminal and the wireless accessory device. The second wireless communication connection may be different from the established wireless communication connection. The wireless signal may be a signal from the mobile terminal to the wireless accessory device, or may be a signal from the wireless accessory device to the mobile terminal.

In other embodiments, the alert signal may be provided responsive to a received signal strength of the communicated wireless signal. The received signal strength may indicate that the proximity between the mobile terminal and the wireless accessory device has exceeded the predetermined range. In addition, the alert signal may be provided when the communicated wireless signal is not received within a predetermined period of time.

In some embodiments, an audible, visible, and/or tactile alert signal may be provided. The alert signal may be provided at an increasing frequency and/or intensity over a predetermined period of time.

In other embodiments, the alert signal may be canceled when the proximity between the mobile terminal and the wireless accessory device indicated by the communicated wireless signal is within the predetermined range. The alert signal may not be provided responsive to a loss of the established wireless communication connection and/or a failure to provide the associated support function.

In some embodiments, the associated support function may be a keyboard/keypad function, a memory storage function, a microphone function, an earpiece speaker function, a camera function, a pager function, and/or a display function. In other embodiments, the wireless accessory device may be a portable handsfree (PHF) device.

According to some embodiments of the present invention, the wireless signal may be received from the mobile terminal to indicate a presence thereof within the predetermined range of the wireless accessory device. As such, the alert signal may be provided from the wireless accessory device when the mobile terminal is not within the predetermined range.

In some embodiments, the associated support function of the wireless accessory device may be disabled when the mobile terminal is not within the predetermined range of the wireless accessory device. The disabled associated support function may be re-enabled responsive to subsequently receiving the wireless signal from the mobile terminal indicating the presence thereof within the predetermined range of the wireless accessory device.

In other embodiments, after providing the alert signal, a second wireless signal may be received from a second mobile terminal indicating a presence thereof within the predetermined range of the wireless accessory device, and a second wireless communication connection may be established between the wireless accessory device and the second mobile terminal. A request may be transmitted to the second mobile terminal over the second wireless communication connection to call the first mobile terminal.

In some embodiments, a second alert signal may be provided from the mobile terminal when the mobile terminal is not within the predetermined range of the wireless accessory device. As such, alert signals may be provided from both the mobile terminal and the wireless accessory device when the mobile terminal is not within the predetermined range.

According to other embodiments of the present invention, the wireless signal may be received from the wireless accessory device to indicate a presence thereof within the predetermined range of the mobile terminal. As such, the alert signal may be provided from the mobile terminal when the wireless accessory device is not within the predetermined range.

In some embodiments, at least one function of the mobile terminal may be disabled when the wireless accessory device is not within the predetermined range of the mobile terminal. The at least one disabled function of the mobile terminal may be re-enabled responsive to subsequently receiving the wireless signal from the wireless accessory device indicating the presence thereof within the predetermined range of the mobile terminal. In addition, the at least one disabled function of the mobile terminal may be re-enabled responsive to authenticating a user of the mobile terminal, for example, based on a password and/or a personal identification number received from the user. Also, a user selection specifying the at least one function of the mobile terminal to be disabled may be received responsive to authenticating a user of the mobile terminal.

In other embodiments, a predetermined number may be called using the mobile terminal when the wireless signal is not received from the wireless accessory device within a predetermined period of time. For example, a location of the mobile terminal may be determined using a GPS transceiver therein, and a different predetermined number may be called using the mobile terminal based on the determined location.

In some embodiments, the wireless signal may be received from one of a plurality of wireless accessory devices based on priority information for the plurality of wireless accessory devices. The plurality of wireless accessory devices may respectively have an associated support function for use with the mobile terminal, and the priority information may be based on a location of the mobile terminal.

In other embodiments, a second alert signal may be provided from the wireless accessory device when the wireless accessory device is not within the predetermined range of the mobile terminal. As such, alert signals may be provided from both the mobile terminal and the wireless accessory device when the wireless accessory device is not within the predetermined range.

According to other embodiments of the present invention, a method of detecting proximity at a portable device includes establishing a first wireless communication connection between a mobile terminal and a wireless accessory device having an associated support function for use with the mobile terminal. The first wireless communication connection is utilized to provide the associated support function. A wireless signal having a limited range is communicated between the mobile terminal and the wireless accessory device over a second wireless communication connection therebetween to indicate a proximity between the mobile terminal and the wireless accessory device. An alert signal is provided indicating that the proximity between the mobile terminal and the wireless accessory device has exceeded a predetermined range responsive to the communicated wireless signal.

According to further embodiments of the present invention, a wireless accessory device is provided having an associated support function for use with a mobile terminal. The wireless accessory device includes a transceiver, a receiver, a controller coupled to the transceiver and the receiver, and a user interface coupled to the controller. The transceiver is configured to establish a wireless communication connection between the wireless accessory device and the mobile terminal. The controller is configured to utilize the wireless communication connection to provide the associated support function. The receiver is configured to receive a wireless signal having a limited range from the mobile terminal. The wireless signal indicates a presence of the mobile terminal within a predetermined range of the wireless accessory device. When the mobile terminal is not within the predetermined range, the user interface is configured to provide an alert signal when the established wireless communication connection is not being utilized to provide the associated support function.

In some embodiments, the receiver may be part of the transceiver, and may be configured to receive the wireless signal over the established wireless communication connection. In other embodiments, the receiver may be a short-range receiver configured to receive the wireless signal from the mobile terminal over a second wireless communication connection. The second wireless communication connection may be different from the established wireless communication connection.

In other embodiments, the user interface may be configured to provide the alert signal responsive to a received signal strength of the wireless signal. The received signal strength may indicate that the mobile terminal is not within the predetermined range. In addition, the user interface may be configured to provide the alert signal when the wireless signal is not received from the mobile terminal within a predetermined period of time.

In some embodiments, the user interface of the wireless accessory device may include a speaker configured to provide an audible alert signal, a display configured to provide a visible alert signal, and a vibrating mechanism configured to provide a tactile alert signal. The user interface may be configured to provide the alert signal at an increasing frequency and/or intensity over a predetermined period of time.

In other embodiments, the user interface may be configured to cancel the alert signal responsive to subsequently receiving the wireless signal from the mobile terminal indicating the presence thereof within the predetermined range of the wireless accessory device.

In some embodiments, the controller may be configured to disable the associated support function of the wireless accessory device when the mobile terminal is not within the predetermined range of the wireless accessory device. In addition, the controller may be further configured to re-enable the disabled associated support function responsive to subsequently receiving the wireless signal from the mobile terminal indicating the presence thereof within the predetermined range of the wireless accessory device.

In other embodiments, the associated support function may include a keyboard/keypad function, a memory storage function, a microphone function, an earpiece speaker function, a camera function, a pager function, and/or a display function.

In some embodiments, the controller may be configured to activate the transceiver to establish a second wireless communication connection between the wireless accessory device and a second mobile terminal within the predetermined range of the wireless accessory device. The controller may be further configured to transmit a request to the second mobile terminal to call the first mobile terminal over the second wireless communication connection via the transceiver when the wireless signal is not received from the first mobile terminal within a predetermined period of time.

In other embodiments, the transceiver may be further configured to transmit a request to the mobile terminal to provide a second alert signal from the mobile terminal when the mobile terminal is not within the predetermined range of the wireless accessory device. As such, both the mobile terminal and the wireless accessory device may be configured to provide alert signals when the mobile terminal is not within the predetermined range.

According to still further embodiments of the present invention, a mobile terminal includes a transceiver, a receiver, a controller coupled to the transceiver and the receiver, and a user interface coupled to the controller. The transceiver is configured to establish a wireless communication connection between the mobile terminal and a wireless accessory device having an associated support function. The controller is configured to cooperate with the wireless accessory device to provide the associated support function utilizing the wireless communication connection. The receiver is configured to receive a wireless signal having a limited range from the wireless accessory device. The wireless signal indicates a presence of the wireless accessory device within a predetermined range of the mobile terminal. When the wireless accessory device is not within the predetermined range, the user interface is configured to provide an alert signal when the established wireless communication connection is not being utilized to provide the associated support function. The mobile terminal is a cellular telephone, and the wireless accessory device is a portable accessory device that is configured to provide the support function for use with the cellular telephone.

In some embodiments, the transceiver may include the receiver, and may be configured to receive the wireless signal over the established wireless communication connection. In other embodiments, the receiver may be a short-range receiver configured to receive the wireless signal from the wireless accessory device over a second wireless communication connection. The second wireless communication connection may be different from the established wireless communication connection.

In some embodiments, the user interface may be configured to provide the alert signal responsive to a received signal strength of the wireless signal. The received signal strength may indicate that the wireless accessory device is not within the predetermined range. In addition, the user interface may be configured to provide the alert signal when the wireless signal is not received from the wireless accessory device within a predetermined period of time.

In other embodiments, the user interface of the mobile terminal may include a speaker configured to provide an audible alert signal, a display configured to provide a visible alert signal, and a vibrating mechanism configured to provide a tactile alert signal. The user interface may be configured to provide the alert signal at an increasing frequency and/or intensity over a predetermined period of time. In addition, the user interface may be configured to cancel the alert signal responsive to subsequently receiving the wireless signal from the wireless accessory device.

In some embodiments, the controller may be configured to disable at least one function of the mobile terminal when the wireless accessory device is not within the predetermined range. The controller may be further configured to re-enable the at least one disabled function of the mobile terminal responsive to subsequently receiving the wireless signal from the wireless accessory device indicating the presence thereof within the predetermined range of the mobile terminal. Also, the controller may be configured to authenticate a user of the mobile terminal via the user interface and re-enable the at least one disabled function of the mobile terminal responsive to authentication of the user.

In other embodiments, the user interface may be configured to receive user identification information, such as a personal identification number and/or a password, from a user of the mobile terminal. The controller may be configured to authenticate the user based on the received user identification information. The controller may also be configured to receive a user selection of the at least one function of the mobile terminal to be disabled responsive to authentication of the user.

In some embodiments, the controller may be configured to activate the transceiver to call a predetermined number when the wireless signal is not received from the wireless accessory device within a predetermined period of time. More particularly, the mobile terminal may include a GPS transceiver coupled to the controller. The GPS transceiver may be configured to determine a location of the mobile terminal, and the controller may be configured to activate the transceiver to call a different predetermined number based on the determined location of the mobile terminal.

In some embodiments, the mobile terminal may further include a memory coupled to the controller. The memory may be configured to store priority information for a plurality of wireless accessory devices having respective associated support functions. For example, the priority information may be based on a location of the mobile terminal. The transceiver may be configured to receive the wireless signal from one of the plurality of wireless accessory devices based on the priority information.

In other embodiments, the transceiver may be further configured to transmit a request to the wireless accessory device to provide a second alert signal from the wireless accessory device when the wireless accessory device is not within the predetermined range of the mobile terminal. As such, both the mobile terminal and the wireless accessory device may be configured to provide alert signals when the wireless accessory device is not within the predetermined range.

While described above primarily with reference to method and device aspects, it will be understood that embodiments of the present invention may also include systems and computer program products configured to detect the proximity of a portable device.

DETAILED DESCRIPTION OF EMBODIMENTS OF THE INVENTION

Figure 1A:
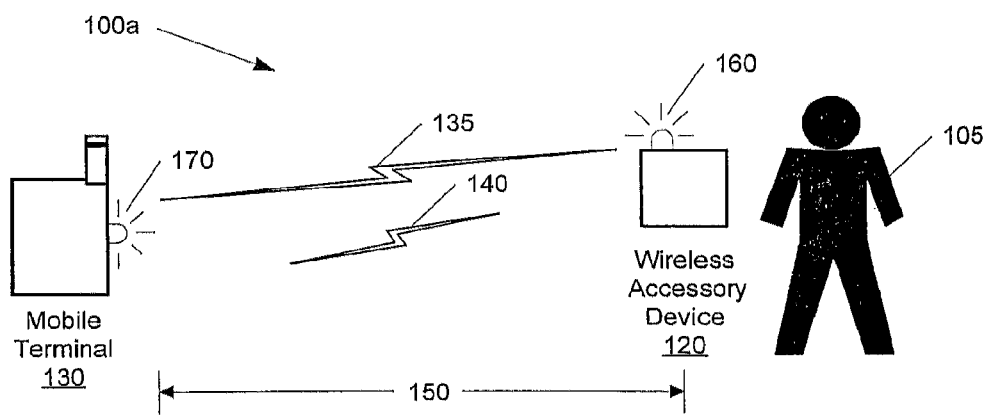
FIGS. 1A and 1B are diagrams illustrating methods and devices for detecting a proximity between mobile devices according to some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/ or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. In contrast, when an element is referred to as being "directly coupled" or "directly connected" to another element, there are no intervening elements present. Furthermore, "connected" or "coupled" as used herein may include wirelessly connected or coupled. As used herein, the term "and/or" includes any and all combinations of one or more of the associated listed items, and may be abbreviated as "/".

It will also be understood that, although the terms first, second, etc. may be used herein to describe various elements, these elements should not be limited by these terms. These terms are only used to distinguish one element from another. For example, a first wireless communication connection could be termed a second wireless communication connection, and, similarly, a second wireless communication connection could be termed a first wireless communication connection without departing from the teachings of the disclosure.

As will be appreciated by one of skill in the art, the present invention may be embodied as methods, systems, and devices. Accordingly, the present invention may be embodied in hardware and/or in software (including firmware, resident software, micro-code, etc.). Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package. The program code may execute entirely on a one device, or partly on one device and partly on another device.

The present invention is described below with reference to flowchart illustrations and/or block and/or flow diagrams of methods, systems, and devices according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block and/or flow diagram block or blocks.

These computer program instructions may also be stored in a computer-readable memory that can direct a computer or other programmable processor to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "mobile terminal" may include both devices having only a wireless signal receiver without transmit abilities, and devices having both receive and transmit hardware capable of two-way communication over a two-way communication link. Such devices may include cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer, calendar and/or a global positioning system (GPS) receiver; and/or conventional laptop and/or palmtop computers or other appliances, which include a radio frequency receiver.

Some embodiments of the present invention provide methods, systems, and devices for alerting a user of a mobile terminal and/or a wireless accessory device when a distance or proximity between the mobile terminal and the wireless accessory device exceeds a predetermined range, such as when one or both of the devices are lost, misplaced, or stolen. More particularly, FIGS. 1A and 1B illustrate exemplary systems and methods for detecting proximity at a mobile device according to some embodiments of the present invention.

Figure 1B:
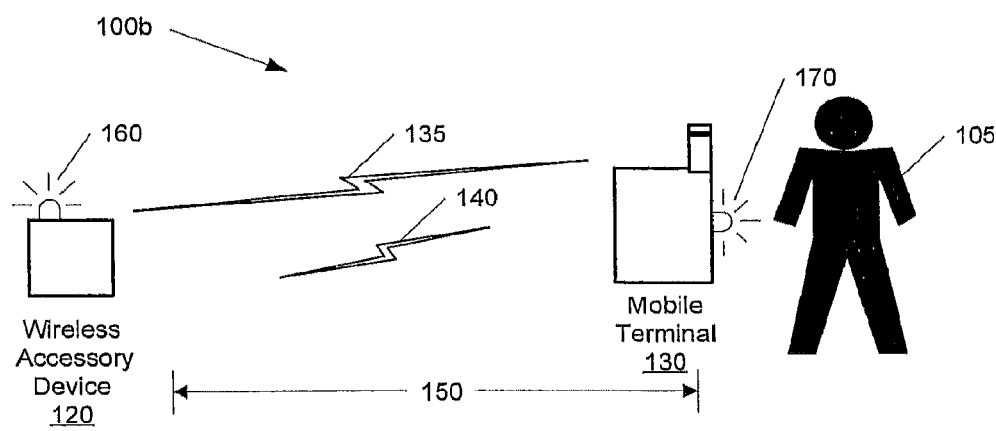

Referring now to FIGS. 1A and 1B, systems 100a and 100b include a wireless accessory device 120 and a mobile terminal 130. For example, the mobile terminal 130 may be a cellular radio telephone, as mentioned above. The wireless accessory device 120 is configured to provide an associated support function for use with the mobile terminal 130. For example, the wireless accessory device 120 may be a BLUETOOTH® accessory, such as a portable handsfree (PHF) headset, for use with the mobile terminal 130. However, depending on the functionality offered by the wireless accessory device 120, the associated support function may be a keyboard/keypad function, a memory storage function, a microphone function, an earpiece speaker function, a camera function, a camera remote control function, a pager function, a display function, and/or other support functions, as are well-known in the art.

A wireless communication connection 135 may be established between the wireless accessory device 120 and the mobile terminal 130, and the established wireless communication 135 connection may be utilized to provide the associated support function. For example, the wireless communication connection 135 may be an infrared (IR), BLUETOOTH®, or Wi-Fi (IEEE 802.11) connection. In addition, a wireless signal 140 having a limited range is communicated between the mobile terminal 130 and the wireless accessory device 120. For example, the wireless signal 140 may be a designated signal, such as a ranging signal, communicated between the mobile terminal 130 and the wireless accessory device 120 over the established wireless communication connection 135. In contrast, the wireless signal 140 may also be communicated over a second communication connection between the mobile terminal 130 and the wireless accessory device 120 that is different from the established wireless communication connection 135.

Still referring to FIGS. 1A and 1B, the wireless signal 140 indicates a proximity or distance between the mobile terminal 130 and the wireless accessory device 120. The wireless signal 140 may be transmitted by the wireless accessory device 120 and received by the mobile terminal 130 and/or may be transmitted by the mobile terminal 130 and received by the wireless accessory device 120. In other words, the wireless signal 140 may be a one-way signal or a two-way signal. When the proximity between the mobile terminal 130 and the wireless accessory device 120 exceeds a predetermined range 150, alert signals 160 and/or 170 may be respectively provided by the wireless accessory device 120 and/or the mobile terminal 130.

More particularly, as shown in FIG. 1A, the wireless accessory device 120 receives the wireless signal 140 from the mobile terminal 130. The wireless signal 140 indicates a presence of the mobile terminal 130 within the predetermined range 150 of the wireless accessory device 120. For example, the wireless accessory device 120 may determine that the mobile terminal 130 is within the predetermined range 150 based on a signal strength of the wireless signal 140, and/or simply based on receipt of the wireless signal 140 within a predetermined period of time. However, when the mobile terminal 130 is not within the predetermined range 150 of the wireless accessory device 120, the wireless accessory device 120 provides an alert signal 160 indicating that the proximity between the mobile terminal 130 and the wireless accessory device 120 has exceeded the predetermined range 150.

For example, the wireless accessory device 120 may be a BLUETOOTH®-compatible PHF headset, and the mobile terminal 130 may be a BLUETOOTH®-compatible cellular telephone. A user 105 wearing the wireless accessory device 120 may use the mobile terminal 130 to make a phone call utilizing a wireless BLUETOOTH® communication connection therebetween. However, upon completion of the call, the user 105 may inadvertently leave the mobile terminal 130 behind, while still wearing the wireless accessory device 120 on the user's ear. As such, when the proximity between wireless accessory device 120 and the mobile terminal 130 exceeds the predetermined range 150, an alert signal 160 is provided by the wireless accessory device 120, to alert the user 105 that the mobile terminal 130 has been left behind. The mobile terminal 130 may also provide an alert signal 170 when the predetermined range 150 has been exceeded.

Similarly, as shown in FIG. 1B, the mobile terminal 130 receives the wireless signal 140 from the wireless accessory device 120, indicating a presence of the wireless accessory device 120 within the predetermined range 150 of the mobile terminal 130. As such, if the user 105 of the mobile terminal 130 inadvertently leaves the wireless accessory device 120 behind (or if the wireless accessory device 120 is stolen and/or otherwise separated from the mobile terminal 130), the mobile terminal 130 provides an alert signal 170 indicating that the proximity between the mobile terminal 130 and the wireless accessory device 120 has exceeded the predetermined range 150. The wireless accessory device 120 may also provide an alert signal 160 when it is not within the predetermined range 150 of the mobile terminal 130.

The alert signals 160 and/or 170 may be audible (such as a beep and/or audio message), visible (such as a displayed alphanumeric message or light emitting diode (LED) indicator), and/or tactile (such as a vibration) alert signals, and may be provided with a sufficient frequency and/or intensity to notify the user 105 that the proximity between the wireless accessory device 120 and the mobile terminal 130 is not within the predetermined range 150. Also, the frequency and/or intensity of the alert signals 160 and/or 170 may be increased over a predetermined period of time and/or range between the devices 120 and 130. More specifically, the alert signals 160 and/or 170 may be graduated, such that the intensity, frequency, and/or displayed message starts in a relatively inconspicuous manner and gradually increases over time and/or range to become more noticeable. The predetermined range 150 and the alert signals 160 and/or 170 may be user-definable.

It should be noted that, in some embodiments, the alert signals 160 and/or 170 may be provided when the established wireless communication between the mobile terminal 130 and the wireless accessory device 120 is not being used to provide the associated support function. More specifically, a loss of the associated support function (for example, due to exceeding the range of the wireless communication connection) would typically alert the user 105 of a problem with the mobile terminal 130 and/or the wireless accessory device 120 when the associated support function is in use.

In addition, the functionality of the wireless accessory device 120 and/or the mobile terminal 130 may be reduced and/or disabled when the proximity between the two devices exceeds the predetermined range 150. For example, the associated support function may be disabled in the wireless accessory device 120, and the ability to make and/or receive calls may be disabled in the mobile terminal 130. A personal identification number (PIN) and/or password may be entered by the user 150 to restore the functionality. As such, unauthorized use of the mobile terminal 130 and/or the wireless accessory device 120 may also be reduced and/or prevented.

Also, although not shown, the wireless accessory device 120 may be configured to be docked and/or attached to the mobile terminal 130 for charging and/or storage of the wireless accessory device 120. When docked in such a manner, communication of the wireless signal 140 between the mobile terminal 130 and the wireless accessory device 120 may be disabled, for example, to conserve energy. The communication of the wireless signal 140 may be automatically re-enabled when charging is complete.

Accordingly, as illustrated in FIGS. 1A and 1B, a wireless accessory device 120 that is paired, for example, using a BLUETOOTH® connection, with a mobile terminal 130 may use the pairing or loss of pairing as an indication that the mobile terminal 130 and/or the wireless accessory device 120 has been lost, misplaced, and/or stolen. The mobile terminal 130 and the wireless accessory device 120 may each periodically send a wireless confirmation signal to the other when there is no other communication already providing such confirmation. If the wireless accessory device 120 does not receive the communication from the mobile terminal 130 for a predetermined period of time, it may presume that the mobile terminal 130 has been left behind, lost, and/or otherwise separated from the wireless accessory device 120 by greater than the predetermined range 150. As such, the wireless accessory device 120 can provide an alert signal 160 to the user 105 to indicate that it is no longer communicating with the mobile terminal 130. In addition, the mobile terminal 130 may also provide the alert signal 170 when beyond the predetermined range 150, indicating that it is no longer communicating with the wireless accessory device 120. However, if the mobile terminal 130 comes back within the predetermined range 150 of the wireless accessory device 120, the alert signals 160 and/or 170 may be canceled. As such, the user 105 may be alerted by the wireless accessory device 120 and/or the mobile terminal 130 when one has been separated from the other by more than a predetermined range 150, which may reduce the likelihood of loss and/or theft of the devices 120 and/or 130.

It should be understood that, in some embodiments of the present invention, one of the wireless accessory device 120 or the mobile terminal 130 may be a simpler device configured to provide the wireless signal 140 used for the proximity detection, while the other may be configured to detect proximity and/or provide the alert signal as described above. More generally, although FIGS. 1A and 1B illustrate exemplary systems and methods for detecting the proximity of wireless devices to reduce loss and/or theft thereof according to some embodiments of the present invention, it will be understood that the present invention is not limited to such configurations, but is intended to encompass any configuration capable of carrying out the operations described herein.

Figure 2:
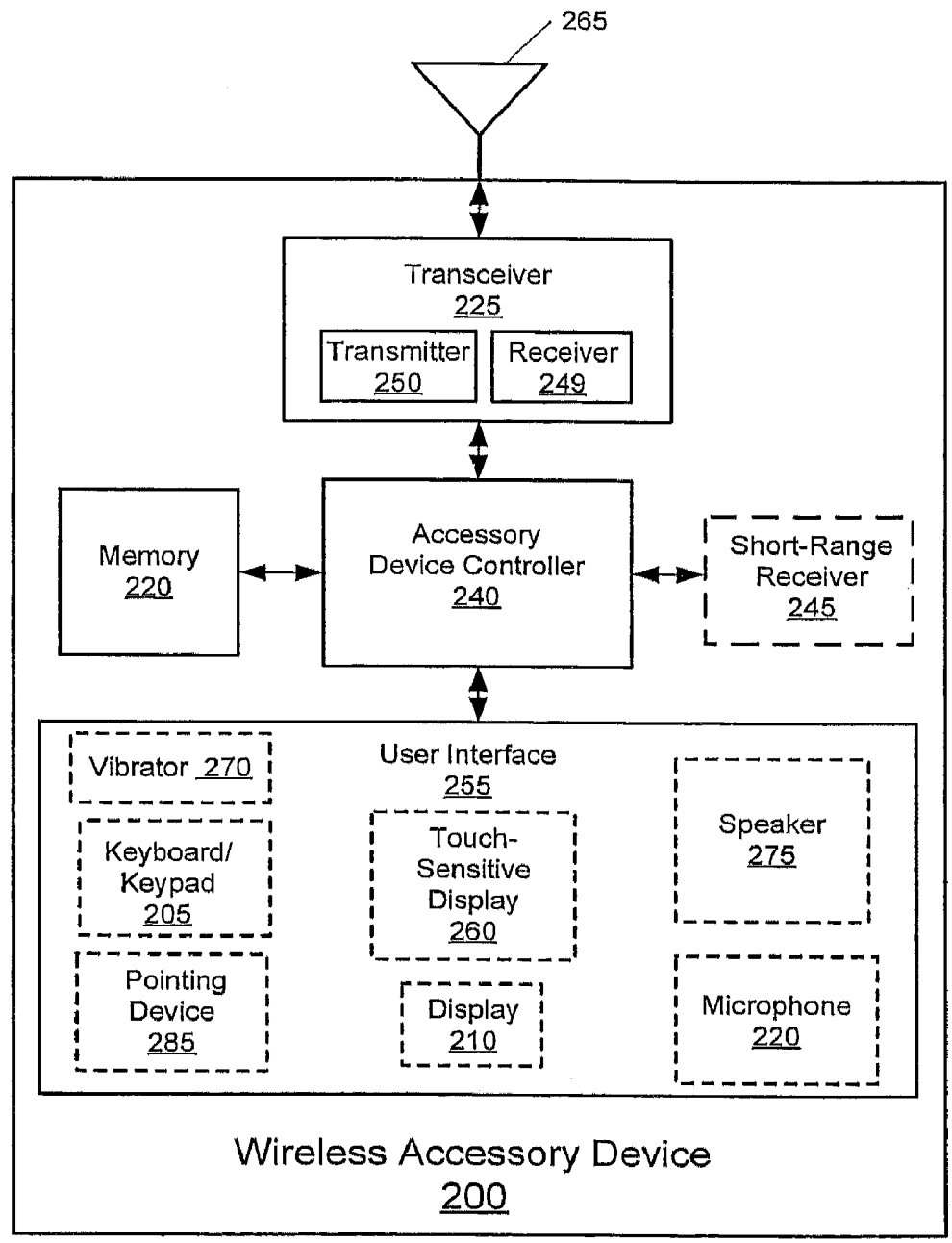
FIG. 2 is a block diagram illustrating a wireless accessory device according to some embodiments of the present invention.

FIG. 2 is a block diagram illustrating a wireless accessory device 200 according to some embodiments of the present invention. In some embodiments, the wireless accessory device 200 may correspond to the wireless accessory device 120 of FIGS. 1A and 1B. Referring now to FIG. 2, the wireless accessory device 200 includes a transceiver 225, an antenna 265, an accessory device controller 240, a memory 220, and a user interface 255. Depending on the functionalities provided by the wireless accessory device 200, the user interface 255 may include a microphone 220, a display 210 (such as a liquid crystal display), a keyboard/keypad 205, a touch sensitive display 260, a vibrating mechanism 270, a speaker 275, and/or a pointing device 285 (such as a mouse, trackball, touchpad, etc.). However, additional and/or fewer elements of the user interface 255 may be provided.

The transceiver 225 may include a transmitter 250 and a receiver 249. The transceiver 225 may be configured to establish a wireless communication connection between the wireless accessory device 200 and a mobile terminal, such as the mobile terminal 130 of FIGS. 1A and 1B. For example, the transceiver 225 may include a wireless local area network interface transceiver that supports formation of an ad hoc wireless local area network. The wireless local area network interface transceiver, for example, may be provided according to an infrared (IR), Wi-Fi (IEEE 802.11), and/or BLUETOOTH® standard.

The accessory device controller 240 is coupled to the transceiver 225, the memory 220, and the user interface 255. The accessory device controller 240 may, for example, be a commercially available or custom microprocessor that is configured to coordinate and manage operations of the transceiver 225, the memory 220, and/or the user interface 255. As such, the accessory device controller 240 may be configured to establish a wireless communication connection, such as an infrared (IR), BLUETOOTH®, and/or Wi-Fi connection, with a mobile terminal, such as the mobile terminal 130 of FIGS. 1A and 1B, using the transceiver 225. In addition, the accessory device controller 240 is configured to provide a support function associated with the wireless accessory device 200. As described above, the associated support function may include a keyboard/keypad function, a memory storage function, a microphone function, an earpiece speaker function, a camera function, a camera remote control function, a pager function, a display function, and/or other support function. The accessory device controller 240 is configured to provide the associated support function utilizing the wireless communication connection.

Still referring to FIG. 2, the transceiver 225 may also be configured to receive a wireless signal from a mobile terminal indicating a presence thereof within a predetermined range of the wireless accessory device 200. More particularly, the receiver 249 of the transceiver 225 may be configured to receive the wireless signal over the established wireless communication connection between the wireless accessory device 200 and the mobile terminal. For example, the wireless signal may be a ranging signal that is received over the established wireless communication connection. Also, in some embodiments, the wireless accessory device 200 may include a short-range receiver 245 that is separate from the transceiver 225. As such, the short-range receiver 245 may be configured to receive the wireless signal from the mobile terminal over a second wireless communication connection that is different from the wireless communication connection established by the transceiver 225.

Based on the wireless signal received via the transceiver 225 and/or the short-range receiver 245, the accessory device controller 240 can determine whether the mobile terminal is within the predetermined range of the wireless accessory device 200. Accordingly, the user interface 255 is configured to provide an alert signal when the mobile terminal is not within the predetermined range of the wireless accessory device 200. For example, the user interface 255 may be configured to provide the alert signal responsive to a received signal strength to the wireless signal, indicating that the mobile terminal is not within the predetermined range. More particularly, a relatively strong received signal strength may indicate that the mobile terminal is within the predetermined range, while a relatively weak received signal strength may indicate that the mobile terminal is beyond the predetermined range. The user interface 255 may also be configured to provide the alert signal when the wireless signal is not received from the mobile terminal within a predetermined period of time. In addition, the user interface 255 may be configured to provide the alert signal only when the established wireless communication connection is not being utilized to provide the associated support function, as a loss of the established wireless communication connection and/or a failure to provide the associated support function may indicate a problem with the wireless accessory device 200 and/or the mobile terminal.

The alert signal provided by the user interface 255 may be an audible, visible, and/or tactile alert signal. More particularly, the speaker 275 of the user interface 255 may be configured to provide the audible alert signal, the display 210 may be configured to provide the visible alert signal, and the vibrator 270 may be configured to provide the tactile alert signal. In addition, the user interface 255 may be configured to provide the alert signal at an increasing frequency and/or intensity over a predetermined period of time. Also, the user interface 255 may be configured to cancel the alert signal responsive to subsequently receiving an indication that the mobile terminal has returned within the predetermined range via the transceiver 225 and/or the short-range receiver 245.

In addition, the accessory device controller 240 may be configured to disable the associated support function of the wireless accessory device 200 when the mobile terminal is not within the predetermined range of the wireless accessory device 200. For example, when the wireless accessory device 200 is a BLUETOOTH®-compatible PHF headset, the accessory device controller 240 may be configured to disable the speaker 275 and/or the microphone 220 of the wireless accessory device 200 when the wireless signal is not received from the mobile terminal within a predetermined period of time. As a further example, when the wireless accessory device 200 is a portable keyboard, the accessory device controller 240 may be configured to disable the keypad 205 responsive to receiving a wireless signal from the mobile terminal having a relatively weak signal strength. Accordingly, unauthorized use of the wireless accessory device 200 may be reduced and/or prevented. However, the accessory device controller 240 may be configured to re-enable the disabled associated support function responsive to subsequently receiving an indication of the presence of the mobile terminal within the predetermined range of the wireless accessory device 200. As such, the functionality of the wireless accessory device 200 may be restored when a user (carrying the mobile terminal) returns to collect the wireless accessory device 200 after noticing the alert signal. Also, the accessory device controller 240 may be configured to re-enable the disabled support function responsive to authentication of a user, for example, based on a personal identification number and/or a password.

The transceiver 225 of the wireless accessory device 200 may also be configured to transmit a request to the user's mobile terminal to provide a second alert signal from the user's mobile terminal when the mobile terminal is not within the predetermined range of the wireless accessory device 200, but is within a sufficient range to receive the request. As such, both the wireless accessory device 200 and the mobile terminal may be configured to provide an alert signal if the proximity therebetween exceeds the predetermined range. Moreover, in some embodiments, the accessory device controller 240 may be configured to activate the transceiver 225 to establish a second wireless communication connection between the wireless accessory device 200 and a second mobile terminal within the predetermined range of the wireless accessory device 200, and transmit a request to the second mobile terminal to place a call to the first mobile terminal via the transceiver 225. In other words, after providing the alert signal and responsive to not receiving the wireless signal from the user's mobile terminal within a predetermined period of time, the wireless accessory device 200 may be configured to utilize a transceiver of another mobile terminal to call the user's mobile terminal when the wireless accessory device 200 is lost, stolen, and/or otherwise separated from the user's mobile terminal by a distance greater than the predetermined range.

As such, the wireless accessory device 200 according to some embodiments of the present invention is configured to provide a proximity alert function in addition to the associated support function for use with a mobile terminal. However, it should be understood that, in some embodiments, the proximity detection and alert functionality may be included in the mobile terminal, and the wireless accessory device may be a simpler device that is configured to provide the wireless signal. More generally, although FIG. 2 illustrates an exemplary wireless accessory device that may be used to detect proximity of mobile devices according to some embodiments of the present invention, it will be understood that the present invention is not limited to such a configuration, but is intended to encompass any configuration capable of carrying out the operations described herein.

In addition, although described above primarily with reference to receipt of the wireless signal by the transceiver 225 and/or the short-range receiver 245, the wireless accessory device 200 may include a camera, and receipt of video data by the camera may be used to determine that the proximity of the mobile terminal is within and/or has exceeded the predetermined range of the wireless accessory device 200. Also, although the memory 220 of the wireless accessory device 200 is illustrated as separate from the accessory device controller 240, the memory 220 or portions thereof may be considered as a part of the controller 240. More generally, while particularly functionalities are shown in particular blocks by way of illustration, functionalities of different blocks and/or portions thereof may be combined, divided, and/or eliminated.

Figure 3:
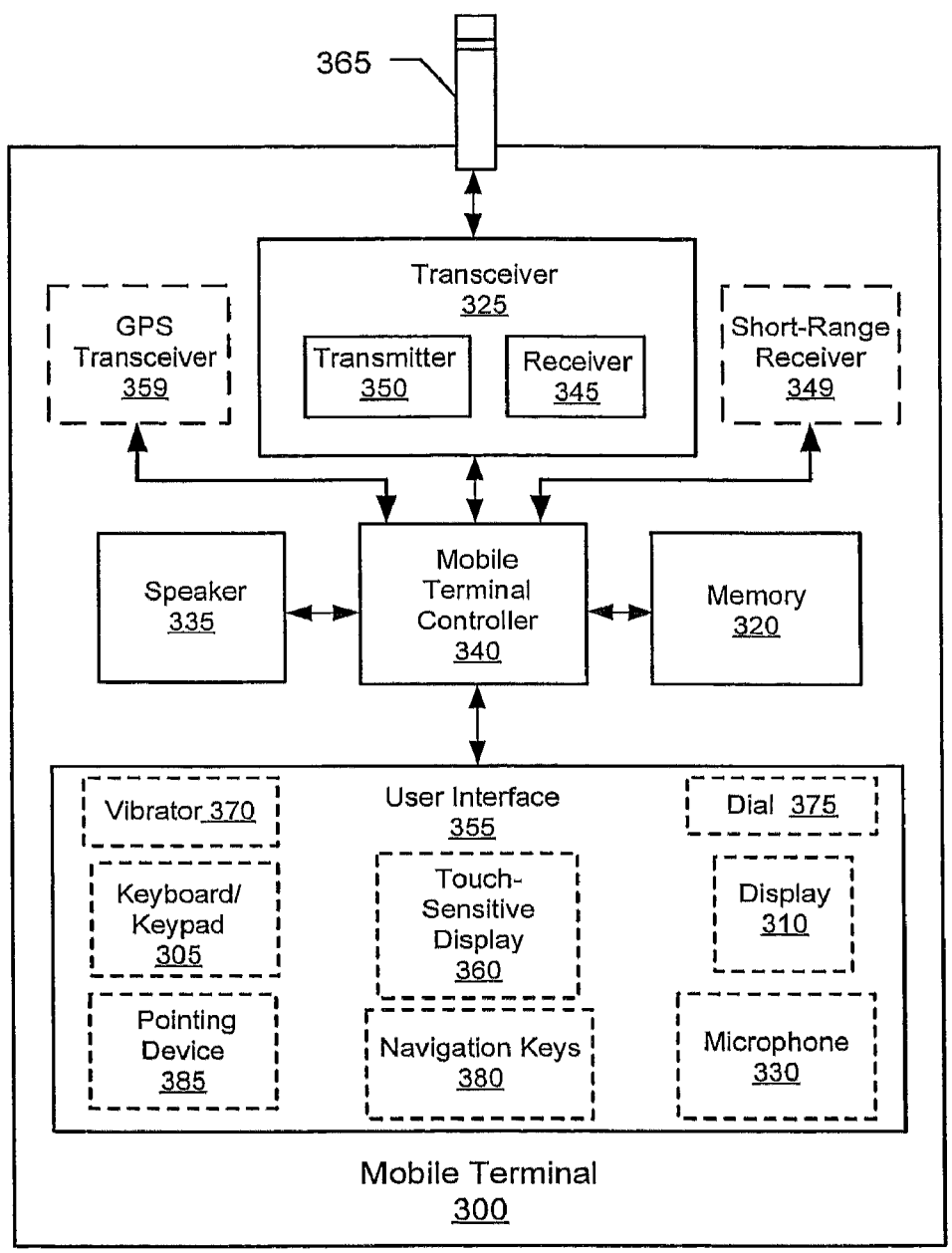
FIG. 3 is a block diagram illustrating a mobile terminal according to some embodiments of the present invention.

FIG. 3 is a block diagram illustrating a mobile terminal 300 according to some embodiments of the present invention. In some embodiments, the mobile terminal 300 may correspond to the mobile terminal 130 of FIGS. 1A and 1B. As shown in FIG. 3, the mobile terminal 300 includes a transceiver 325, an antenna 365, a mobile terminal controller 340, a memory 320, a speaker 335, and a user interface 355. Depending on the functionalities offered by the mobile terminal 300, the user interface 355 may include a microphone 330, a display 310 (such as a liquid crystal display), a vibrating mechanism 370, a keyboard/keypad 305, a touch-sensitive display 360, a dial 375, directional/navigation keys 380, and/or a pointing device 385 (such as a mouse, trackball, touchpad, etc.). However, additional and/or fewer elements of the user interface 355 may be provided. For example, the touch-sensitive display 360 may be provided in a PDA that does not include a display 310, a keypad 305, and/or a pointing device 385. In addition, the mobile terminal may include a short-range receiver 349 and a GPS transceiver 359. While a single antenna 365 is illustrated in FIG. 3 by way of example, separate antennas may be provided for the transceiver 325, the short-range receiver 349, and/or the GPS transceiver 359. Multiple antennas may also be shared and/or may be provided for one or both of the transceiver 325, the short-range receiver 349, and/or the GPS transceiver 359.

The transceiver 325 includes a transmitter 350 and a receiver 345. The transceiver 325 may include a wireless local area network interface transceiver, such as an infrared (IR), Wi-Fi and/or BLUETOOTH® transceiver, and/or a public land mobile network (PLMN) transceiver. As such, the transceiver 325 may be configured to establish a wireless communication connection between the mobile terminal 300 and a wireless accessory device, such as the wireless accessory device 200 of FIG. 2, having an associated support function for use with the mobile terminal 300. For example, the mobile terminal 300 may be a cellular telephone, and the wireless accessory device may be a PHF headset for use with the mobile terminal 300.

The controller 340 is coupled to the transceiver 325, the memory 320, the speaker 335, and the user interface 355. The mobile terminal controller 340 may be, for example, a commercially available or custom microprocessor that is configured to coordinate and manage operations of the transceiver 325, the memory 320, the speaker 335, and the user interface 355. Accordingly, the mobile terminal controller 340 may be configured to establish a wireless communication connection, such as an infrared (IR), BLUETOOTH®, Wi-Fi, and/or PLMN connection, with another mobile terminal and/or a wireless accessory device, such as the wireless accessory device 200 of FIG. 2, using the transceiver 325. The controller 340 may also be configured to cooperate with the wireless accessory device to utilize the wireless communication connection to provide the associated support function for use with the mobile terminal 300.

Still referring to FIG. 3, the transceiver 325 may also be configured to receive a wireless signal having a limited range from the wireless accessory device, indicating a presence thereof within a predetermined range of the mobile terminal 300. More particularly, the receiver 345 of the transceiver 325 may be configured to receive the wireless signal over the established wireless communication connection between the wireless accessory device and the mobile terminal 300. For example, the wireless signal may be a ranging signal that is received over the established wireless communication connection. Also, in some embodiments, the mobile terminal 300 may include a short-range receiver 349 that is separate from the transceiver 325 and is configured to receive the wireless signal from the wireless accessory device over a separate wireless communication connection. In other words, the short-range receiver 349 may be configured to receive the wireless signal indicating the presence of the wireless accessory device within a predetermined range of the mobile terminal 300 over a second wireless communication connection that is different from the wireless communication connection established by the transceiver 325. The wireless signal from the wireless accessory device may be received according to a wireless local area networking standard, such as Wi-Fi and/or BLUETOOTH®.

When the wireless accessory device is not within a predetermined range of the mobile terminal 300, the mobile terminal controller 340 may be configured to provide an alert signal via the user interface 355. For example, the user interface 355 may be configured to provide the alert signal responsive to a received signal strength of the wireless signal indicating that the wireless accessory device is not within the predetermined range. More particularly, a relatively strong received signal strength may indicate that the wireless accessory device is within the predetermined range of the mobile terminal 300, while a relatively weak received signal strength may indicate that the wireless accessory device is not within the predetermined range. In addition, the user interface 355 may be configured to provide the alert signal when the wireless signal is not received from the wireless accessory device within a predetermined period of time. The user interface 355 may be configured to provide the alert signal when the established wireless communication connection is not being utilized to provide the associated support function, as a loss of the wireless communication connection and/or a failure to provide the associated support function may itself be recognized as an indication of a problem with the mobile terminal 300 and/or the wireless accessory device when the associated support function is being used.

The alert signal provided by the user interface 355 may be an audible, visible, and/or tactile alert signal. More particularly, the user interface 355 may be configured to provide an audible alert signal using the speaker 335, a visible alert signal using the display 310, and/or a tactile alert signal using the vibrating mechanism 370. The user interface 355 may also be configured to provide the alert signal at an increasing frequency and/or intensity over a predetermined period of time. In addition, the user interface 355 may be configured to cancel the alert signal responsive to subsequently receiving an indication that the wireless accessory device has returned within the predetermined range of the mobile terminal 300, via the transceiver 325 and/or the short-range receiver 349.

The mobile terminal controller 340 may also be configured to disable at least one function of the mobile terminal 300 when the wireless accessory device is not within the predetermined range. For example, the controller 340 may be configured to lock the keypad 305 of the mobile terminal 300 to completely prevent use of the mobile terminal 300 by unauthorized users. In addition, the controller 340 may be configured to disable only the ability to make or receive calls using the mobile terminal 300. As such, unauthorized charges to the owner's account may be limited, while access to other functions of the mobile terminal 300 that may be useful to identify the owner, such as the address book, may still be allowed. The controller 340 may also be configured to receive a user selection specifying the particular mobile terminal function(s) to be disabled, for example, responsive to authentication of the user. The mobile terminal controller 340 may be further configured to re-enable the disabled function(s) of the mobile terminal 300 responsive to subsequently receiving an indication of the presence of the wireless accessory device within the predetermined range. As such, the functionality of the mobile terminal 300 may be restored when a user who has inadvertently misplaced the mobile terminal 300 re-enters the predetermined range (carrying the wireless accessory device) to collect the mobile terminal 300 responsive to noticing the alert signal.

In addition, the mobile terminal controller 340 may be configured to authenticate a user of the mobile terminal 300, and re-enable the disabled function(s) of the mobile terminal 300 responsive to authentication of the user. More particularly, the user interface 355 may be configured to receive user identification information, such as a password and/or personal identification number, from a user of the mobile terminal 300. The controller 340 may be configured to authenticate the user based on the received user identification information to override disablement of the function(s). As such, an owner of the mobile terminal 300 may still be able to use the mobile terminal 300 without the wireless accessory device and/or even if the wireless accessory device is not within the predetermined range. It should be noted that the predetermined range, the intensity and/or frequency of the alert signal, and/or other features according to embodiments of the present invention may also be selected, disabled, and/or overridden responsive to authentication of the user of the mobile terminal 300.

Moreover, the mobile terminal controller 340 may be further configured to activate the transceiver 325 to call a predetermined number when the wireless signal is not received from the wireless accessory device within a predetermined period of time. For example, if the mobile terminal 300 is lost and/or stolen, and the proximity between the mobile terminal 300 and the wireless accessory device carried by the user exceeds a predetermined range, the mobile terminal controller 340 may be configured to place a call to the user, for example, at the user's home and/or business telephone number. The controller 340 may also be configured to activate the transceiver 325 to call a different predetermined number based on the physical location of the mobile terminal 300. More particularly, the mobile terminal 300 may include a GPS transceiver 359 configured to determine the location of the mobile terminal 300, and the transceiver 325 may be configured to call a different number based on the determined location. For example, the GPS transceiver 359 may determine that the mobile terminal 300 has been left behind at a restaurant near the user's office location, and a call may be placed to the user's office telephone number using the transceiver 325. Similarly, the mobile terminal 300 may provide its determined location by accessing a particular website and/or sending a message (such as a SMS message) to a particular e-mail address. The mobile terminal 300 may also determine its location based on the network and/or a default location where the mobile terminal 300 is normally used.

Also, the memory 320 of the mobile terminal 300 may be configured to store priority information for a plurality of wireless devices having respective associated support functions for use with the mobile terminal 300. The transceiver 325 and/or the short-range receiver 349 may be configured to receive a proximity-indicating wireless signal from one of the plurality of wireless accessory devices based on the priority information stored in the memory 320. For example, the priority information may be based on the location of the mobile terminal 300, as determined by the GPS transceiver 359. As such, the mobile terminal 300 may selectively receive a wireless signal indicating a proximity of a different wireless accessory device based on the location of the mobile terminal 300.

For example, when a user is at the office, the mobile terminal 300 may be configured to receive the wireless signal from a keyboard accessory. The wireless signal may indicating a presence of the keyboard accessory within the predetermined range of the mobile terminal 300. Accordingly, the alert signal may be provided by the user interface 355 if the proximity between the mobile terminal 300 and the keyboard accessory exceeds the predetermined range, for instance, to remind the user that he is leaving the office without the keyboard accessory. In contrast, when the user is at home, the mobile terminal 300 may be configured to receive the wireless signal from a portable flash memory device attached to the user's keychain. Thus, if the user attempts to leave the house without the mobile terminal 300, the user interface 355 may provide the alert signal to remind the user the mobile terminal 300 has been left behind. Similarly, if the user picks up the mobile terminal 300 and exceeds the predetermined range of the flash memory device attached to the user's keychain, the user interface 355 of the mobile terminal 300 may provide the alert signal to remind the user that he is leaving without his keys.

The alert signal may be provided at an intensity that may be sufficient for a user to see and/or hear the alert signal from beyond the predetermined range. Also, range permitting, the transceiver 325 of the mobile terminal 300 may be configured to transmit a request to the wireless accessory device to provide a second alert signal from the wireless accessory device when it is not within the predetermined range of the mobile terminal 300. As such, both the mobile terminal 300 and the wireless accessory device may be configured to provide an alert signal if the proximity between the mobile terminal 300 and the wireless accessory device has exceeded the predetermined range.

It should be noted that the wireless signal may be a one-way signal received at the mobile terminal 300 from the wireless accessory device, a one-way signal transmitted from the mobile terminal 300 to the wireless accessory device, or a two-way communication signal transmitted and received from both the mobile terminal 300 and the wireless accessory device. As such, in some embodiments, the proximity detection and alert functionality may be included in the wireless accessory device, and the mobile terminal 300 may be a simpler device that is configured to provide the wireless signal.

Although FIG. 3 illustrates an exemplary mobile terminal configured to detect proximity of mobile devices according to some embodiments of the present invention, it will be understood that the present invention is not limited to such a configuration, but is intended to encompass any configurations capable of carrying out the operations described herein. For example, although described above primarily with reference to receipt of the wireless signal by the transceiver 325 and/or the short-range receiver 349, the mobile terminal 300 may include a camera, and receipt of video data by the camera may be used to determine that the proximity of the wireless accessory device is within and/or has exceeded the predetermined range of the mobile terminal 300. In addition, although the transceiver 325, the short-range receiver 349, and the GPS transceiver 359 are illustrated as separate elements, the functionality of the transceiver 325, the short-range receiver 349, and/or the GPS transceiver 359 may be included in a single transceiver. More generally, while particular functionalities are shown in particular blocks of FIG. 3 by way of illustration, functionalities of different blocks and/or portions thereof may be combined, divided, and/or eliminated.

Exemplary operations which may be performed by a mobile terminal and/or a wireless accessory device having an associated support function for use with the mobile terminal in accordance with some embodiments of the present invention will now be described with reference to the flow charts of FIGS. 4-6.

Figure 4:
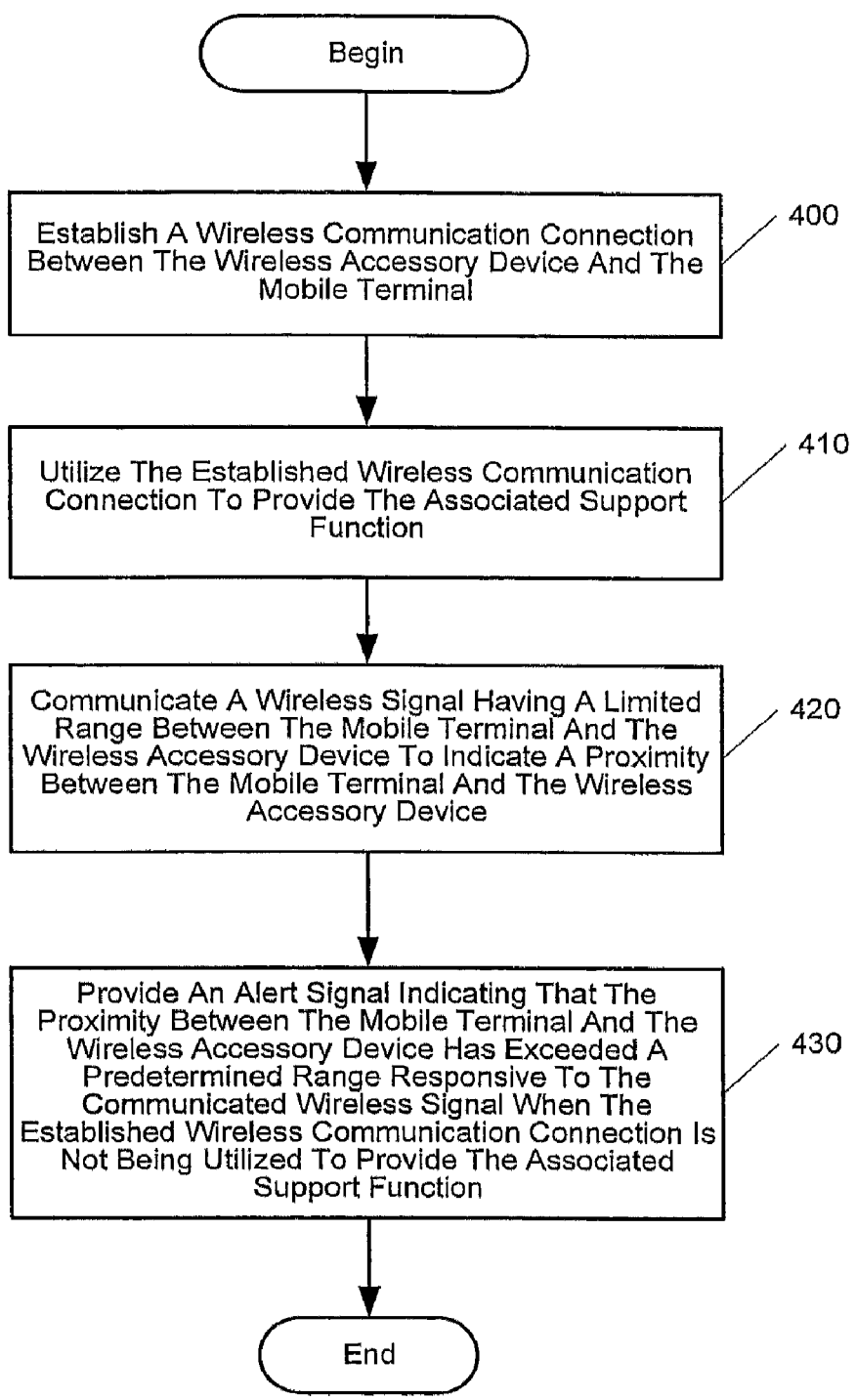
FIG. 4 is a flowchart illustrating methods of operating mobile terminals and/or wireless accessory devices according to some embodiments of the present invention.

Referring now to FIG. 4, operations begin at Block 400 when a wireless communication connection is established between a wireless accessory device and a mobile terminal. For example, the wireless communication connection may be established according to an ad hoc wireless networking standard, such as BLUETOOTH® and/or Wi-Fi. At Block 410, the established wireless communication connection is utilized to provide the associated support function. For example, the associated support function may be a keyboard/keypad function, a memory storage function, a microphone function, an earpiece speaker function, a camera function, a pager function, a display function, and/or other support function that may be provided by the wireless accessory device for use with the mobile terminal. In addition, a wireless signal having a limited range is communicated between the mobile terminal and the wireless accessory device at Block 420. The wireless signal indicates a proximity between the mobile terminal and the wireless accessory device. For example, the wireless signal may be one-way signal transmitted by one of the mobile terminal and the wireless accessory device, and received by the other. In addition, the wireless signal may be a two-way communication signal transmitted and received by both the mobile terminal and the wireless accessory device. The wireless signal may be a designated signal communicated over the established wireless communication connection between the wireless accessory device and the mobile terminal, or may be communicated over a second wireless communication connection between the mobile terminal and the wireless accessory device that is different from the established wireless communication connection.

Still referring to FIG. 4, an alert signal is provided at Block 430 indicating that the proximity between the mobile terminal and the wireless accessory device has exceeded a predetermined range. The alert signal is provided responsive to the communicated wireless signal. For example, the alert signal may be provided responsive to a received signal strength of the communicated wireless signal indicating that the proximity between the mobile terminal and the wireless accessory device has exceeded the predetermined range. Also, the alert signal may be provided when the communicated wireless signal is not received within a predetermined period of time. The alert signal may be provided when the established wireless communication connection is not being utilized to provide the associated support function. As such, the alert signal may not be provided responsive to a loss of the established wireless communication connection and/or a failure to provide the associated support function, as either condition may itself indicate a problem with the mobile terminal and/or the wireless accessory device. It should be understood that one or both of the mobile terminal and/or the wireless accessory device may provide the alert signal, depending on whether the wireless signal is a one-way signal or a two-way signal. In addition, only one of the mobile terminal or the wireless accessory device may be configured to perform the proximity detection operations illustrated in FIG. 4, while the other device may be a simpler device configured to provide the wireless signal.

Figure 5:
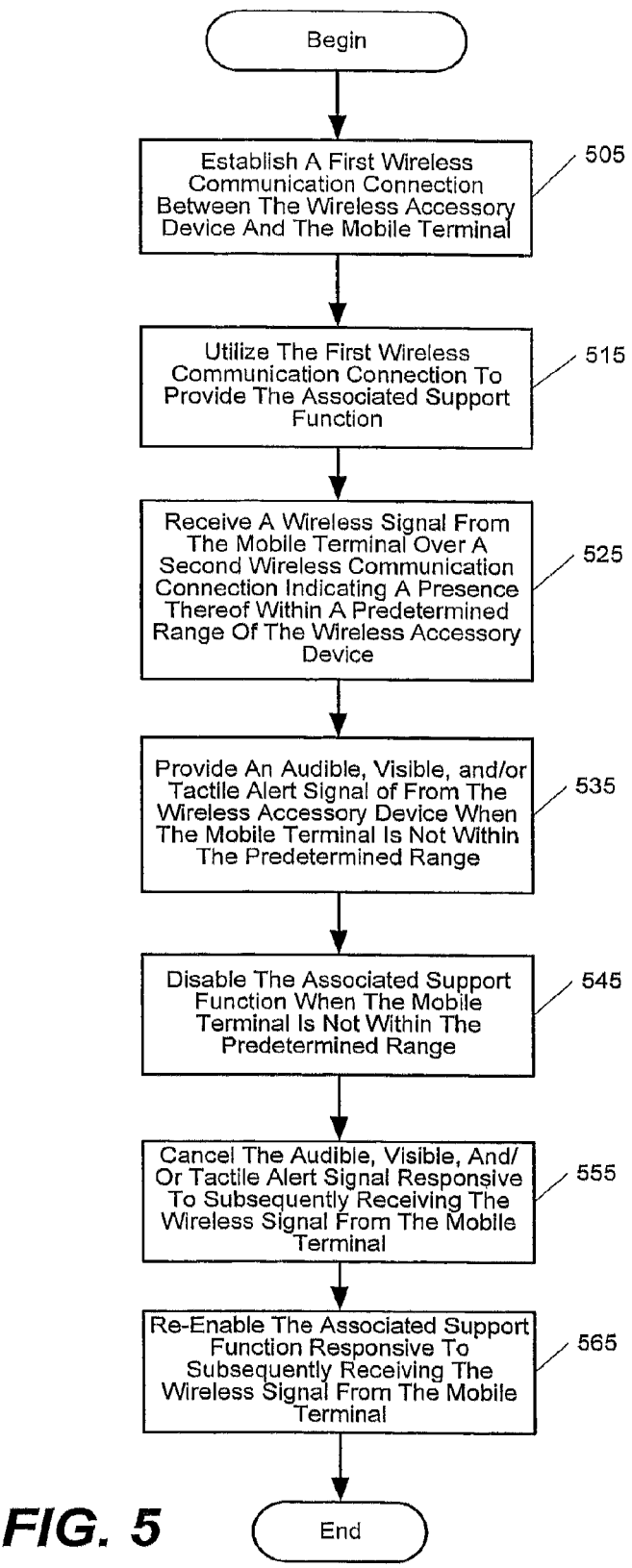
FIG. 5 is a flowchart illustrating operations that may be performed by a wireless accessory device according to some embodiments of the present invention.

FIG. 5 illustrates operations and methods which may be performed by a wireless accessory device according to some embodiments of the present invention. Referring now to FIG. 5, operations begin at Block 505 when a first wireless communication connection is established between the wireless accessory device and the mobile terminal. The first wireless communication connection is utilized to provide the support function associated with the wireless accessory device at Block 515. In addition, at Block 525, a wireless signal is received from the mobile terminal over a second wireless communication connection. The wireless signal indicates a presence of the mobile terminal within a predetermined range of the wireless accessory device. For example, the presence of the mobile terminal within the predetermined range of the wireless accessory device may be determined simply based on receipt of the wireless signal from the mobile terminal, and/or may be determined based on a received signal strength of the wireless signal.

When the mobile terminal is not within the predetermined range of the wireless accessory device, an audible, visible, and/or tactile alert signal is provided from the wireless accessory device at Block 535. For example, the audible, visible, and/or tactile alert signal may be provided at an increasing frequency and/or intensity over a predetermined period of time. The alert signal may be provided by the wireless accessory device when the first wireless communication connection is not being utilized to provide the associated support function. It should be noted that an alert signal may also be provided from the mobile terminal when the mobile terminal is not within the predetermined range of the wireless accessory device, such that the user may be alerted by one or both devices.

The associated support function of the wireless accessory device may also be disabled at Block 545 when the mobile terminal is not within the predetermined range. As such, unauthorized use of the wireless accessory device may be prevented if the wireless accessory device is lost and/or misplaced. However, the audible, visible, and/or tactile alert signal may be canceled responsive to subsequently receiving the wireless signal from the mobile terminal at Block 555. For example, the audible, visible, and/or tactile alert signal may be canceled when a user who has been alerted of the loss of the mobile terminal and/or the wireless accessory device brings the two devices within the predetermined range. Also, at Block 565, the associated support function may be re-enabled responsive to subsequently receiving the wireless signal from the mobile terminal. As such, the functionality of the wireless accessory device may be restored when the proximity between the mobile terminal and the wireless accessory device (as indicated by the wireless signal) returns to within the predetermined range.

Figure 6:
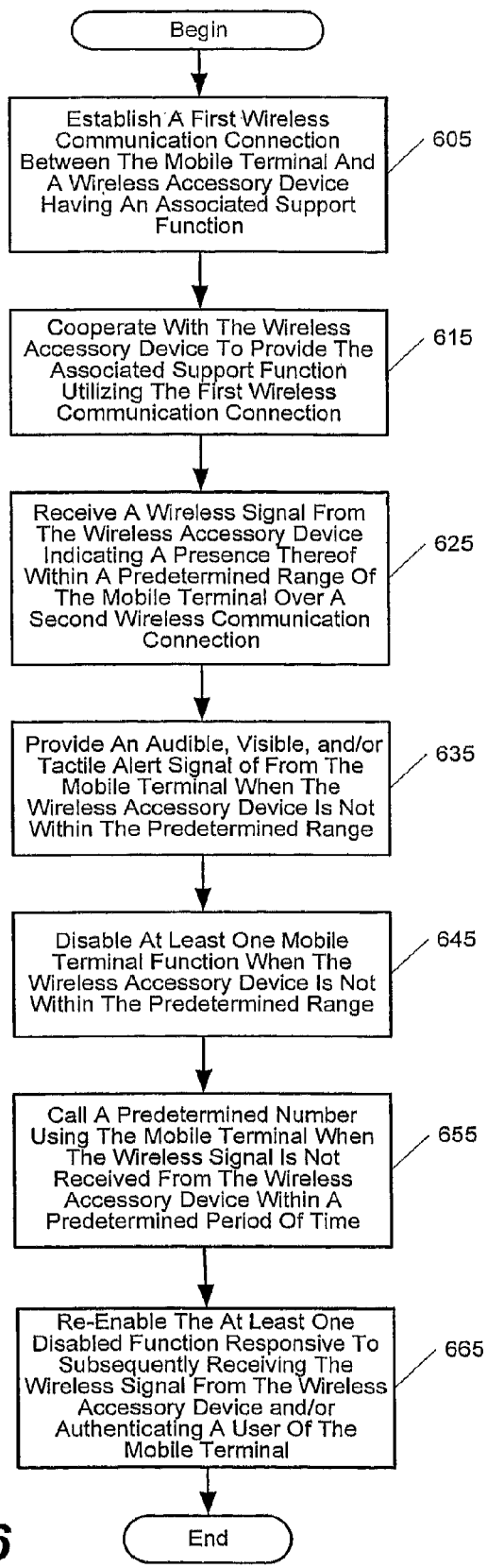
FIG. 6 is a flowchart illustrating operations that may be performed by a mobile terminal according to some embodiments of the present invention.

FIG. 6 illustrates operations and methods which may be performed by a mobile terminal according to some embodiments of the present invention. Referring now to FIG. 6, operations begin at Block 605 when a first wireless communication connection is established between the mobile terminal and a wireless accessory device having an associated support function for use with the mobile terminal. At Block 615, the mobile terminal cooperates with the wireless accessory device to utilize the first wireless communication connection to provide the associated support function. For example, the associated support function may be a wireless headset function, which may be provided to the mobile terminal by the wireless accessory device over a BLUE-TOOTH® wireless connection. Also, at Block 625, a wireless signal is received from the wireless accessory device indicating a presence of the wireless accessory device within a predetermined range of the mobile terminal. The wireless signal is received over a second wireless communication connection that is different from the first wireless communication connection. As such, the presence of the wireless accessory device within the predetermined range of the mobile terminal may be detected based on the received wireless signal.

However, when the wireless accessory device is not within the predetermined range, an audible, visible, and/or tactile alert signal is provided from the mobile terminal at Block 635. For example, the alert signal may be provided based on a failure to receive the wireless signal from the wireless accessory device within a predetermined period of time, and/or based on a received signal strength of the wireless signal from the wireless accessory device indicating that the wireless accessory device is not within the predetermined range. The audible, visible, and/or tactile alert signal may be provided at an increased frequency and/or intensity over a predetermined period of time. It should be noted that an alert signal may also be provided by the wireless accessory device when the wireless accessory device is not within the predetermined range of the mobile terminal, such that the user may be alerted by one or both devices.

In addition, at least one mobile terminal function is disabled when the wireless accessory device is not within the predetermined range of the mobile terminal at Block 645. For example, the ability to make and/or receive a call using the mobile terminal may be disabled when the wireless accessory device is not within the predetermined range, to limit unauthorized use of the mobile terminal if it is lost, stolen, and/or misplaced. The particular function(s) of the mobile terminal to be disabled may be determined responsive to receiving a user selection specifying the function(s) to be disabled. Also, at Block 655, when the wireless signal is not received from the wireless accessory device within a predetermined period of time, a predetermined telephone number may be called using the mobile terminal. For example, if the mobile terminal is lost, stolen, and/or misplaced outside of the predetermined range, the mobile terminal may call the user's home and/or office phone number to alert the user. A different predetermined number may be called using the mobile terminal based on the physical location of the mobile terminal, for example, as determined using a GPS transceiver in the mobile terminal. Also, the mobile terminal may provide its location, as determined by the GPS transceiver, by sending a message to the user's e-mail address.

Still referring to FIG. 6, at least one disabled function of the mobile terminal may be re-enabled at Block 665, responsive to subsequently receiving the wireless signal from the wireless accessory device and/or responsive to authenticating a user of the mobile terminal. For example, one or more disabled functions of the mobile terminal may be re-enabled when a user carrying the wireless accessory device returns within the predetermined range to collect the misplaced mobile terminal responsive to the audible, visible, and/or tactile alert signal provided at Block 635. Also, at least one disabled function may be re-enabled responsive to authenticating a user of the mobile terminal, for example, by receiving a personal identification number and/or password from the user. As such, the mobile terminal can be used without the wireless accessory device if the user so chooses.

The flowcharts and schematic diagrams of FIGS. 1-6 illustrate the architecture, functionality, and operations of some embodiments of methods, systems, devices, and computer program products for operating mobile terminals and/or wireless accessory devices according to the present invention. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

Accordingly, in some embodiments of the present invention, a wireless accessory device having an associated support function may be operated in conjunction with a mobile terminal to reduce and/or prevent loss and/or theft of either device. More particularly, in addition to providing the associated support function, proximity detection and alert signals may be provided by one or both devices when a proximity between the mobile terminal and the wireless accessory device has exceeded a predetermined range. As such, a user may be alerted if the mobile terminal and/or the wireless accessory device is lost, stolen, and/or misplaced.

In the drawings and specification, there have been disclosed typical embodiments of the invention, and, although specific terms are employed, they are used in a generic and descriptive sense only and not for purposes of limitation, the scope of the invention being set forth in the following claims.

That which is claimed:

1. A mobile terminal, comprising:
   a transceiver configured to establish a wireless communication connection between the mobile terminal and a wireless accessory device having an associated support function;
   a receiver configured to receive a wireless signal having a limited range from the wireless accessory device indicating a presence thereof within a predetermined range of the mobile terminal;
   a controller coupled to the transceiver and the receiver and configured to cooperate with the wireless accessory device to utilize the wireless communication connection to provide the associated support function; and
   a user interface coupled to the controller and configured to provide an alert signal when the wireless accessory device is not within the predetermined range and when the established wireless communication connection is not being utilized to provide the associated support function,
   wherein the mobile terminal is a cellular telephone, and wherein the wireless accessory device is a portable accessory device that is configured to provide the support function for use with the cellular telephone.

2. The mobile terminal of claim 1, wherein the receiver is part of the transceiver and is configured to receive the wireless signal over the established wireless communication connection.

3. A mobile terminal, comprising:
   a transceiver configured to establish a wireless communication connection between the mobile terminal and a wireless accessory device having an associated support function;
   a receiver configured to receive a wireless signal having a limited range from the wireless accessory device indicating a presence thereof within a predetermined range of the mobile terminal;
   a controller coupled to the transceiver and the receiver and configured to cooperate with the wireless accessory device to utilize the wireless communication connection to provide the associated support function; and
   a user interface coupled to the controller and configured to provide an alert signal when the wireless accessory device is not within the predetermined range and when the established wireless communication connection is not being utilized to provide the associated support function,
   wherein the receiver comprises a short-range receiver configured to receive the wireless signal from the wireless accessory device over a second wireless communication connection thereto that is different from the established wireless communication connection.

4. A mobile terminal, comprising:
   a transceiver configured to establish a wireless communication connection between the mobile terminal and a wireless accessory device having an associated support function;
   a receiver configured to receive a wireless signal having a limited range from the wireless accessory device indicating a presence thereof within a predetermined range of the mobile terminal;
   a controller coupled to the transceiver and the receiver and configured to cooperate with the wireless accessory device to utilize the wireless communication connection to provide the associated support function; and
   a user interface coupled to the controller and configured to provide an alert signal when the wireless accessory device is not within the predetermined range and when the established wireless communication connection is not being utilized to provide the associated support function,
   wherein the controller is configured to activate the transceiver to call a predetermined number when the wireless signal is not received from the wireless accessory device within a predetermined period of time.

5. The mobile terminal of claim 4, further comprising:
   a GPS transceiver coupled to the controller and configured to determine a location of the mobile terminal,
   wherein the controller is configured to activate the transceiver to call a different predetermined number based on the determined location of the mobile terminal.

6. A mobile terminal, comprising:
   a transceiver configured to establish a wireless communication connection between the mobile terminal and a wireless accessory device having an associated support function;
   a receiver configured to receive a wireless signal having a limited range from the wireless accessory device indicating a presence thereof within a predetermined range of the mobile terminal;
   a controller coupled to the transceiver and the receiver and configured to cooperate with the wireless accessory device to utilize the wireless communication connection to provide the associated support function;
   a user interface coupled to the controller and configured to provide an alert signal when the wireless accessory device is not within the predetermined range and when the established wireless communication connection is not being utilized to provide the associated support function; and
   a memory coupled to the controller and configured to store priority information for a plurality of wireless accessory devices having respective associated support functions,
   wherein the receiver is configured to receive the wireless signal from one of the plurality of wireless accessory devices based on the priority information.

7. The mobile terminal of claim 1, wherein the receiver is configured to receive the wireless signal to provide a proximity detection function different than the associated support function.

8. An article of manufacture for operating a mobile terminal and a wireless accessory device having an associated support function for use with the mobile terminal, the article of manufacture comprising:
- a non-transitory computer readable storage medium including computer readable program code therein, the computer readable program code comprising:
- computer readable program code that, when executed, establishes a wireless communication connection between a mobile terminal and a wireless accessory device having an associated support function for use with the mobile terminal;
- computer readable program code that, when executed, utilizes the established wireless communication connection to provide the associated support function;
- computer readable program code that, when executed, communicates a wireless signal having a limited range between the mobile terminal and the wireless accessory device to indicate a proximity between the mobile terminal and the wireless accessory device to provide a proximity detection function different than the associated support function; and
- computer readable program code that, when executed, provides an alert signal indicating that the proximity between the mobile terminal and the wireless accessory device has exceeded a predetermined range responsive to the communicated wireless signal when the established wireless communication connection is not being utilized to provide the associated support function
- wherein the mobile terminal is a cellular telephone, and wherein the wireless accessory device is a portable accessory device that is configured to provide the support function for use with the cellular telephone.

9. The article of manufacture of claim 8, wherein the wireless signal is communicated over a second wireless communication connection that is different from the established wireless communication connection.

10. The article of manufacture of claim 8, further comprising:
- computer readable program code that, when executed, activates a transceiver of the mobile terminal to call a predetermined number when the wireless signal is not received from the wireless accessory device within a predetermined period of time.

11. The article of manufacture of claim 10, further comprising:
- computer readable program code that, when executed, determines a location of the mobile terminal,
- wherein the computer readable program code that activates the transceiver, when executed, calls a different predetermined number based on the determined location of the mobile terminal.

* * * * *